United States Patent
Bhanage et al.

(10) Patent No.: US 11,818,706 B2
(45) Date of Patent: Nov. 14, 2023

(54) MESH PERFORMANCE USING OVERLAPPING BASIC SERVICE SET (OBSS) COLORING AND TRANSMISSION SCHEDULING

(71) Applicant: Cisco Technology, Inc., San Jose, CA (US)

(72) Inventors: Gautam D. Bhanage, Milpitas, CA (US); Vishal Satyendra Desai, San Jose, CA (US); Ramadhasan Thangachamy, Sunnyvale, CA (US); Ardalan Alizadeh, Milpitas, CA (US); Khashayar Mirfakhraei, Los Altos, CA (US); Robert E. Barton, Richmond (CA); Jerome Henry, Pittsboro, SC (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 17/241,928

(22) Filed: Apr. 27, 2021

(65) Prior Publication Data
US 2022/0346115 A1    Oct. 27, 2022

(51) Int. Cl.
| | |
|---|---|
| *H04W 72/1263* | (2023.01) |
| *H04B 17/318* | (2015.01) |
| *H04W 72/21* | (2023.01) |
| *H04W 84/18* | (2009.01) |
| *H04W 84/12* | (2009.01) |

(52) U.S. Cl.
CPC ...... *H04W 72/1263* (2013.01); *H04B 17/318* (2015.01); *H04W 72/21* (2023.01); *H04W 84/12* (2013.01); *H04W 84/18* (2013.01)

(58) Field of Classification Search
CPC ......... H04W 72/1263; H04W 72/1284; H04W 84/12; H04W 84/18; H04B 17/318
See application file for complete search history.

(56) References Cited

U.S. PATENT DOCUMENTS

| | | | | |
|---|---|---|---|---|
| 2009/0257380 | A1* | 10/2009 | Meier ................ | H04W 72/082 455/73 |
| 2016/0149676 | A1* | 5/2016 | Jauh ...................... | H04W 72/04 370/329 |
| 2017/0085461 | A1* | 3/2017 | Zhou ..................... | H04L 5/0007 |

(Continued)

FOREIGN PATENT DOCUMENTS

| | | | | |
|---|---|---|---|---|
| CA | 2933033 C | * | 10/2019 | ........... H04B 7/2643 |
| JP | 6536577 B2 | * | 7/2019 | ............ H04L 69/22 |
| KR | 100922976 B1 | * | 10/2009 | |

*Primary Examiner* — Saad A. Waqas
(74) *Attorney, Agent, or Firm* — Merchant & Gould P.C.

(57) ABSTRACT

Improved mesh performance using Overlapping Basic Service Set (OBSS) coloring and transmission scheduling may be provided. A controller may determine that a plurality of Access Points (APs) in a mesh network each have a Received Signal Strength Indicator (RSSI) that is in a predetermined range. Next, the controller may assign, in response to determining that the plurality of APs each have the RSSI that is in the predetermined range, OBSS colors to links between the plurality of APs to limit packet collision in the mesh network between the plurality of APs. The controller may then create a transmission schedule for transmissions between the plurality of APs in the mesh network based on the assigned OBSS colors.

18 Claims, 7 Drawing Sheets

(56) References Cited

U.S. PATENT DOCUMENTS

| | | |
|---|---|---|
| 2017/0359300 A1 | 12/2017 | Patil et al. |
| 2017/0367129 A1 | 12/2017 | Yang |
| 2018/0270038 A1* | 9/2018 | Oteri ................... H04W 88/06 |
| 2019/0028898 A1* | 1/2019 | Ko ....................... H04W 16/10 |
| 2022/0303780 A1* | 9/2022 | Koruthu ............... H04W 24/02 |

* cited by examiner

… (1)

MESH PERFORMANCE USING OVERLAPPING BASIC SERVICE SET (OBSS) COLORING AND TRANSMISSION SCHEDULING

TECHNICAL FIELD

The present disclosure relates generally to improved mesh performance using overlapping basic service set (OBSS) coloring and transmission scheduling.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
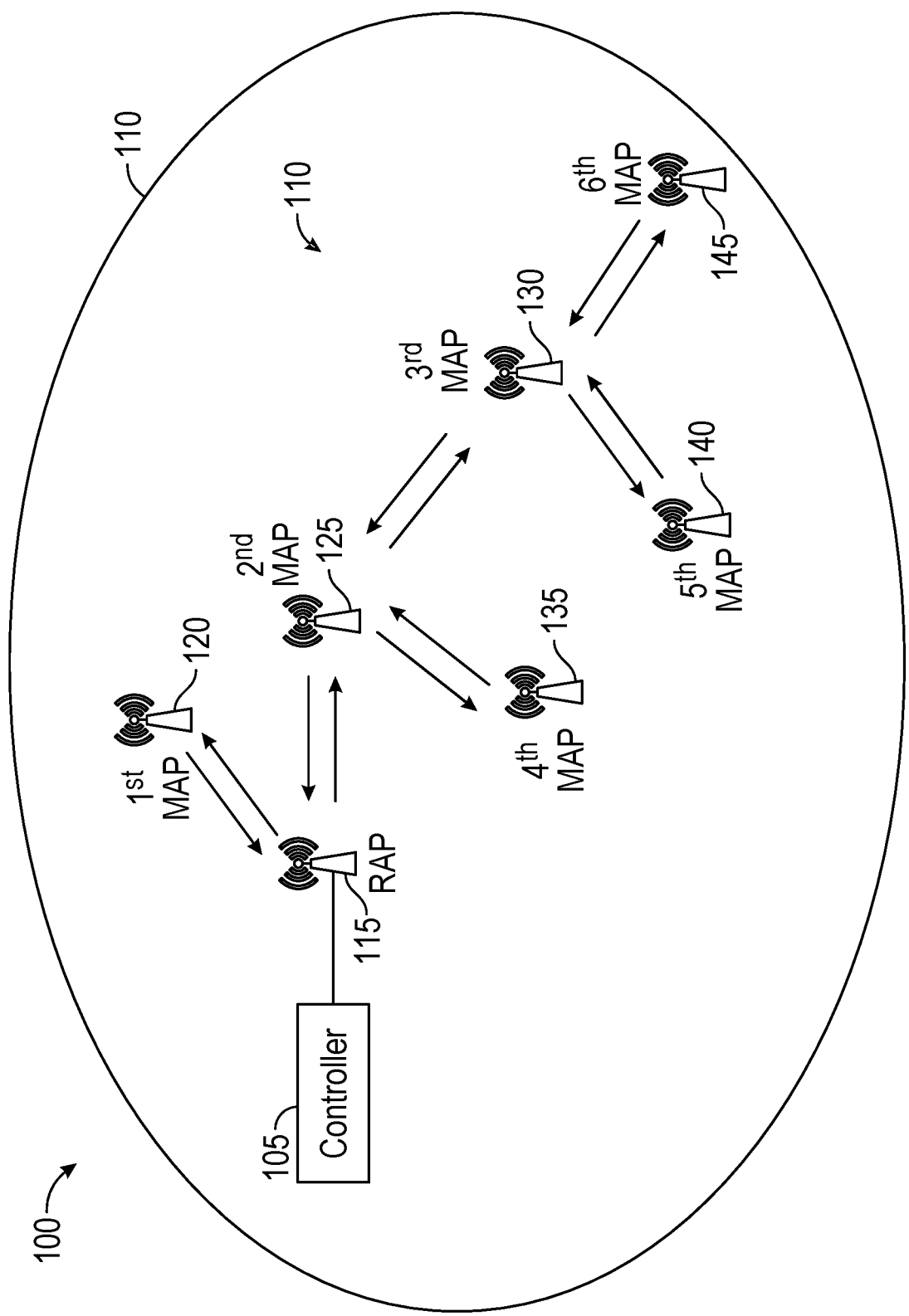
FIG. 1 is a block diagram of an operating environment for providing improved mesh performance using Overlapping Basic Service Set (OBSS) coloring and transmission scheduling.

Improved mesh performance using Overlapping Basic Service Set (OBSS) coloring and transmission scheduling may be provided. A controller may determine that a plurality of Access Points (APs) in a mesh network each have a Received Signal Strength Indicator (RSSI) that is in a predetermined range. Next, the controller may assign, in response to determining that the plurality of APs each have the RSSI that is in the predetermined range, OBSS colors to links between the plurality of APs to limit packet collision in the mesh network between the plurality of APs. The controller may then create a transmission schedule for transmissions between the plurality of APs in the mesh network based on the assigned OBSS colors.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A wireless mesh network may comprise a wireless communications network made up of Access Points (e.g., radio nodes) organized in a mesh topology comprising a mesh tree. These wireless mesh networks may have performance and scalability limitations due to the contention-based nature of the medium. For example, in some wireless mesh networks, only one station may transmit on a given channel at each moment in time. If other stations attempt to transmit, a data packet collision may result and a retransmission may be necessary. In mesh networks, this may be a problem because backhaul links between the APs may use the same channel in the mesh tree. Accordingly, one large contention domain may be created.

Some wireless standards (e.g., Institute of Electrical and Electronics Engineers (IEEE) 802.11ax) may have the ability to leverage Overlapping Basic Service Set (OBSS) coloring that may be used to manipulate backhaul transmission power and schedules on the APs comprising the mesh network. Embodiments of the disclosure may provide a process to centrally control OBSS coloring on a mesh network and schedule uplink and downlink transmissions on each AP in the mesh network, for example, to overcome some limitations of the contention-based processes (e.g., used in some older versions of IEEE 802.11) and thus may improve the performance of a wireless mesh network as well as increase its usable size. In other words, embodiments of the disclosure may improve mesh performance by detecting which mesh APs are in the OBSS/Preamble Detect (PD) threshold and then tweaking mesh backhaul transmit power and assignment of different OBSS coloring, which may allow the controller to structure simultaneous mesh node transmission, thus improving overall mesh performance.

FIG. 1 shows an operating environment 100 for providing improved mesh performance using Overlapping Basic Service Set (OBSS) coloring and transmission scheduling. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for client devices. The plurality of APs may comprise a Root AP (RAP) (e.g., a RAP 115) and Mesh APs (MAPs). The MAPs may comprise a first MAP 120, a second MAP 125, a third MAP 130, a fourth MAP 135, a fifth MAP 140, and a sixth MAP 145. The plurality of APs may be arranged in a mesh configuration, for example, coverage environment 110 may comprise an outdoor wireless environment, such as a mesh (e.g., a Wi-Fi mesh). As shown in FIG. 1, the plurality of APs may be arranged in a mesh tree topology with RAP 115 being the highest level in the mesh tree. RAP 115 may be connected to a wired network.

The plurality of APs may provide wireless network access to a plurality of client devices (not shown) as the plurality of client devices move within coverage environment 110 for example. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide improved mesh performance using OBSS coloring and transmission scheduling. Data may be backhauled through the mesh network back to RAP 115 over uplinks between the plurality of APs. Similarly, data may be fronthauled through the mesh network from RAP 115 over downlinks between the plurality of APs. OBSS coloring and transmission scheduling may be used over these uplinks and downlinks consistent with embodiments of the disclosure.

The elements described above of operating environment 100 (e.g., controller 105, RAP 115, first MAP 120, second MAP 125, third MAP 130, fourth MAP 135, fifth MAP 140, and sixth MAP 145) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Figure 2:
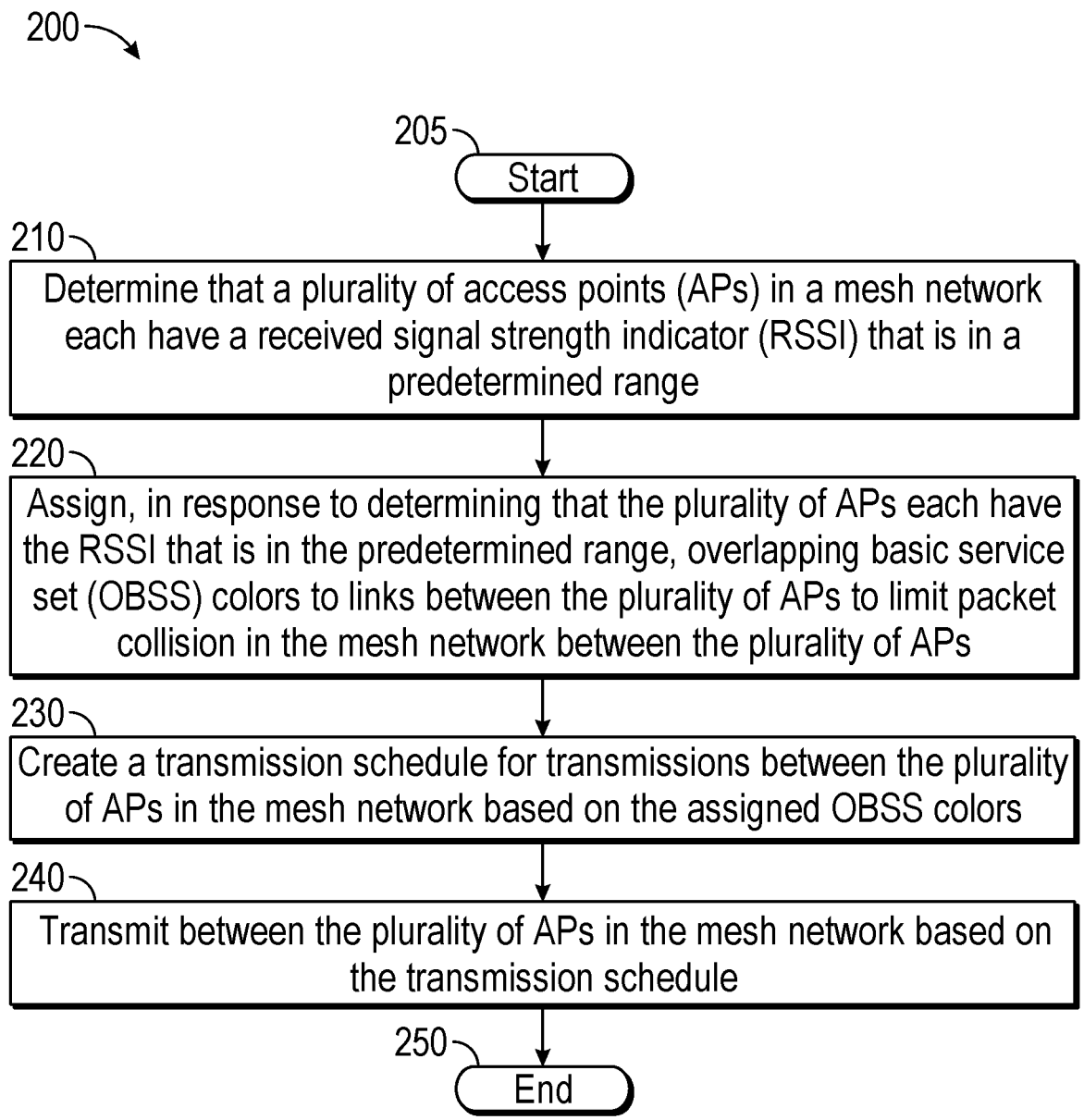
FIG. 2 is a flow chart of a method for providing improved mesh performance using OBSS coloring and transmission scheduling.

FIG. 2 is a flow chart setting forth the general stages involved in a method 200 consistent with an embodiment of the disclosure for providing improved mesh performance using OBSS coloring and transmission scheduling. Method 200 may be implemented using controller 105 as described in more detail above with respect to FIG. 1. Ways to implement the stages of method 200 will be described in greater detail below.

As described above, mesh backhauls may be built around a single channel across the entire mesh thus making one large contention domain. Because of the contention and the associated delay issues, network designers may be discouraged from attempting a backhaul of depth larger than, for example, four hops. Some designers may attempt to break this limitation by implementing APs with two backhaul radios (i.e., daisy-chaining), but this may be workaround, not a solution to the backhaul-as-single-contention-domain issue. As such, embodiments of the disclosure may utilize a mesh tree using a single channel (e.g., IEEE 802.11 channel) on all mesh devices and may not use daisy-chaining.

Embodiments of the disclosure may include central control of OBSS coloring and AP Scheduling Resource Allocation (SRA) processing. Accordingly, embodiments of the disclosure may intelligently structure transmissions on mesh APs (e.g., the RAP and the MAPs) to optimize performance of the mesh network. In other words, embodiments of the disclosure may centralize the OBSS coloring and AP SRA processing on the RAP and the MAPs to optimize the backhaul performance of the mesh network.

Method 200 may begin at starting block 205 and proceed to stage 210 where controller 105 may determine that the plurality of APs in the mesh network (e.g., coverage environment 110) each have a Received Signal Strength Indicator (RSSI) that is in a predetermined range. The predetermined range may comprise, but is not limited to, the OBSS/PD threshold (i.e., within −62 dBm to −82 dBm). For example, controller 105 may determine the topology of the mesh tree comprising coverage environment 110 (i.e., how the plurality of MAPs are connected via backhaul links to other MAPs and the RAP).

Next, time synchronization of the mesh components (i.e., the plurality of APs) may be initiated from controller 105. As described in greater detail below, this time synchronization may be used by controller 105 to initiate simultaneous and structured transmissions for multiple mesh APs. This time synchronization, for example, may be accomplished through IEEE 1588 Precision Time Protocol (PTP) or another similar processes.

Controller 105 may then examine the RAP and MAPs (e.g., RAP 115, first MAP 120, second MAP 125, third MAP 130, fourth MAP 135, fifth MAP 140, and sixth MAP 145) to estimate RSSI proximity through the OBSS/PD mechanism. If a receiving MAP/RAP is, for example, within −62 dBm and −82 dBm of another MAP/RAP in the same mesh network, then it may be considered as distant enough that their radios do not overlap. The AP power level of the APs may be optimized as well.

From stage 210, where controller 105 determines that the plurality of APs in the mesh network (e.g., coverage environment 110) each have an RSSI that is in the predetermined range, method 200 may advance to stage 220 where controller 105 may assign, in response to determining that the plurality of APs each have the RSSI that is in the predetermined range, OBSS colors to links between the plurality of APs to limit packet collision in the mesh network between the plurality of APs. For example, embodiments of the disclosure may allow different OBSS colors to be used on different parts of the mesh, and accordingly for adaptive Clear Channel Assessment (CCA) to selectively ignore neighboring transmissions. Coloring may be assigned by controller 105 and adaptive CCA may then be turn on or off dynamically. In some embodiments, this may allow two neighboring MAPs to receive and transmit at the same time. For example, second map 125 may transmit to RAP 115 while third MAP 130 may transmit to fifth MAP 140, at the same time. Third MAP 130 may use OBSS coloring and adaptive CCA to ignore second map 125's transmissions.

In other embodiments of the disclosure that may complement the above, the plurality of APs may use a selective adaptive CCA mode. In this selective adaptive CCA mode, controller 105 may cause the plurality of APs to enable adaptive CCA selectively for colors when sending to the opposite direction. For example, as shown in FIG. 1, third MAP 130 transmitting to fifth MAP 140, may enable adaptive CCA for the "yellow" color (e.g., which may also be used by RAP 115 when transmitting to second MAP 125), but may not activate adaptive CCA when detecting the "red" color (e.g., which may be used by second MAP 125 possibly sending to fourth MAP 135, but also possibly to third MAP 130).

In some embodiments, some of the plurality of APs may be distant enough that different colors may be used on different sections (i.e., links) of the mesh network (e.g., "yellow" color between RAP 115 and second MAP 125, whereas between second MAP 125 and third MAP 130, red may be used). In other cases, where the OBSS/PD is not in the −62 to −82 dBm range, the colors may be kept the same. The decision as to which color may be used on each backhaul section (i.e., link) of the mesh may be made by controller 105.

In other embodiments, the color may also change adaptively depending on the transmission direction. Thus each of the plurality of the APs may be assigned a color, allowing neighboring APs to use different colors based on the target AP. This adaptive process may avoid collisions while keeping the simultaneous transmission capability. For example, RAP 115 may use "red" to communicate to second MAP 125. Third MAP 130, detecting a "red" label, may refrain from sending to second MAP 125 at the same time. However, third MAP 130 may transmit to fifth MAP 140 using "blue" for example.

Once controller 105 assigns, in response to determining that the plurality of APs each have the RSSI that is in the predetermined range, OBSS colors to links between the plurality of APs to limit packet collision in the mesh network between the plurality of APs in stage 220, method 200 may continue to stage 230 where controller 105 may create a transmission schedule for transmissions between the plurality of APs in the mesh network based on the assigned OBSS colors. For example, controller 105 may now be able to structure transmission scheduling based on the aforementioned mesh coloring process. In cases where mesh APs are of a different color, these APs may transmit simultaneously without risk of interference from the other mesh components. To do this, controller 105 may present a transmission schedule to non-interfering mesh APs that they may be able to simultaneously transmit. The transmission schedule may be made based on an assessment of loads on the ones of the plurality of APs that may comprise chokepoints in the mesh tree (i.e., coverage environment 110). In one embodiment, the controller may consider load Key Performance Indicators (KPIs) to make this assignment. Such KPIs may comprise, but are not limited to, elements like client load, last interval traffic volume, and position in the mesh tree.

In other embodiments, controller 105 may utilize a learning machine technique to predict buffer space of the mesh nodes (i.e., APs) in the next interval. This may be applicable to backbone links between adjacent MAPs and between the MAPs and RAP 115 because traffic load may be likely to be less stochastic (i.e., more predictable) in these places. For example, controller 105 may use Long Short-Term Memory (LSTM) to examine the uplink buffer patterns on the MAPs by analyzing, over time, various input parameters to a Recurrent Neural Network (RNN), such as but not limited to, size of the mesh tree, recent traffic patterns, number of associated client devices, etc. By observing the increase of load and the change in slope (i.e., derivative) of these parameters, controller 105 may estimate the most likely Buffer Status Report (BSR) for the next interval. This process may reduce the necessity of continual load measurements on the backbone links, thus the overall performance of the mesh network may be improved.

In other embodiments, each MAP may send its BSR to an upstream MAP and the resources may be allocated in a chain fashion. For example, fifth MAP 140 may send its BSR to third MAP 130. Sixth MAP 145 may also send its BSR to third MAP 130. Third MAP 130 may then send the sum of its BSR, fifth MAP 140's BSR, and sixth MAP 145's BSR to second MAP 125, and then allocate upstream resources to fifth MAP 140 and sixth MAP 145. At the next Transmission Opportunity (TXOP), first MAP 120 may operate the same action, thus allowing third MAP 130 to forward all traffic to second MAP 125. Such allocations may be balanced by the available resources, and the pro-rata may be a factor of BSR depth and the number of APs that BSR is relayed by the reporting AP. In this mode, upstream and downstream flows may thus alternate, using the aforementioned processes to schedule segments, some transmitting simultaneously and others one after the other.

After controller 105 creates the transmission schedule for transmissions between the plurality of APs in the mesh network based on the assigned OBSS colors in stage 230, method 200 may proceed to stage 240 where data packets may be transmitted between the plurality of APs in the mesh network based on the transmission schedule. Once data packets are transmitted between the plurality of APs in the mesh network based on the transmission schedule in stage 240, method 200 may then end at stage 250.

Other embodiments of the disclosure may reduce self-interference on the mesh backhaul by adapting the transmit OBSS color on a per destination node (i.e., AP) basis while receiving all frames with the same OBSS color. Using such an approach, nodes (i.e., APs) in the mesh backhaul may accept frames with only one color, thus requiring no change in the CCA logic. This may be useful because the CCA logic may operate at a hardware level and it may not have the capability to apply different filters based on frames coming from different source addresses. The color information may be included in a PHY header and the decision to decode a frame may happen before it hits Media Access Control (MAC) components (where source address information may be).

Standards (e.g., IEEE 802.11) may mandate that the color on the radio of an AP may be the same for transmit and receive. Embodiments of the disclosure, using a non-standard approach, may achieve improved performance for the mesh backhaul.

Figure 3:
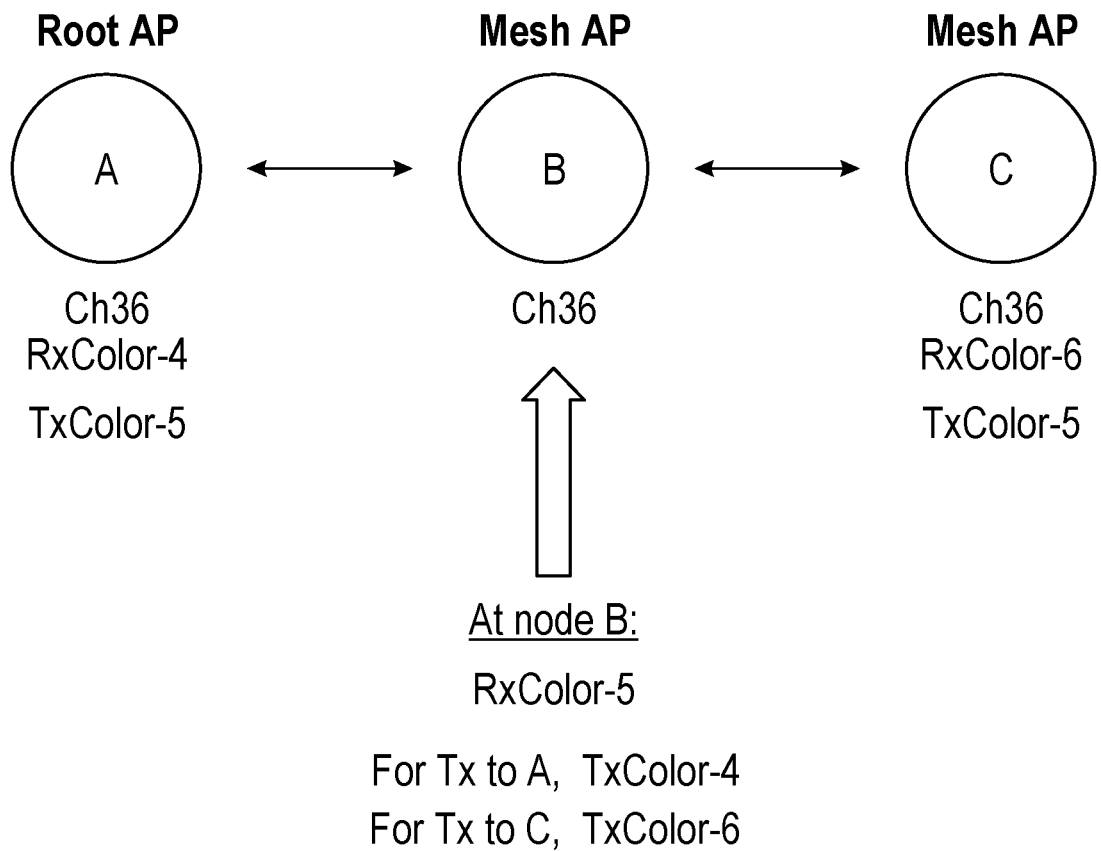
FIG. 3 is a diagram illustrating a mesh network topology.

FIG. 3 is a diagram illustrating a mesh network topology. With respect to FIG. 3, TxColor may refer to the transmit OBSS color used by an AP/client device as a part of a High Efficiency (HE) Physical Layer Protocol Data Unit (PPDU).

RxColor may refer to the receive OBSS color or the OBSS color on which an AP/client device is operating. The OBSS/PD thresholds may be applicable for this color.

Programming Destination Based TxColor

Figure 4:
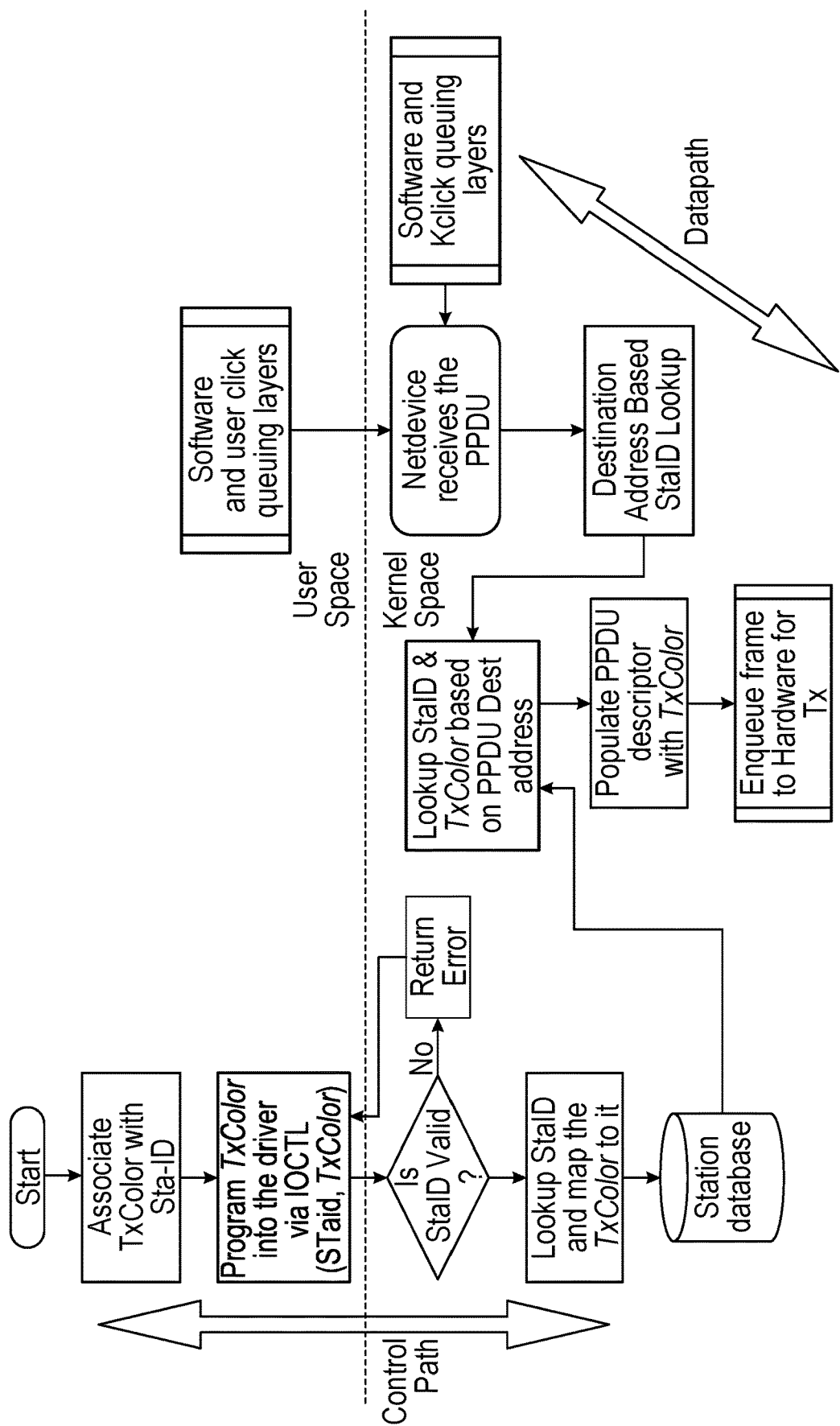
FIG. 4 is a flowchart that illustrates programming destination based TxColor.

FIG. 4 is a flowchart that illustrates programming destination based TxColor. OBSS color may comprise a parameter that may be controlled on a per radio (e.g., in an AP) basis. Besides this, the associated OBSS/PD thresholds may also be configured on the radio level. However, by separating out the TxColor and RxColor, embodiments of the disclosure may simplify the network design. OBSS/PD thresholds, which may comprise a receiver-side function, may now be associated only for the RxColor.

Embodiments of the disclosure may include a frame descriptor based per PPDU TxColor change embodiment. With this embodiment, a mechanism may be relied on that may be available in most radio drivers where frame characteristics may be updated based on the frame descriptor. The frame descriptor may contain meta-information about a frame, for example, the PHY mode of transmission (e.g., HE vs Very High Throughput (VHT)) or the rate or the number of spatial streams.

Embodiments of the disclosure may include a Station/Peer entry based per station TxColor change embodiment. With this embodiment, drivers may maintain an L2 Peer entry. OBSS color may be assigned on a radio level. However, by making changes in the PPDU population mechanism (similar in most radio drivers), embodiments of the disclosure may use a TxColor described on the peer entry. In this way, for every transmission to that peer, the correct TxColor may be used.

Even though these embodiments may be described in the context of the wireless drivers, the lookup and node-based mapping of the TxColor may be done anywhere in the network and passed down to the radio driver. Once this information is available, the radio may map the TxColor for this PPDU data to the TXVECTOR that may be included in the HE-SIG-A PHY header field. For example, it will be appropriately encoded and transmitted in the bits B8 to B13.

Programming Receiver Based RxColor

Figure 5:
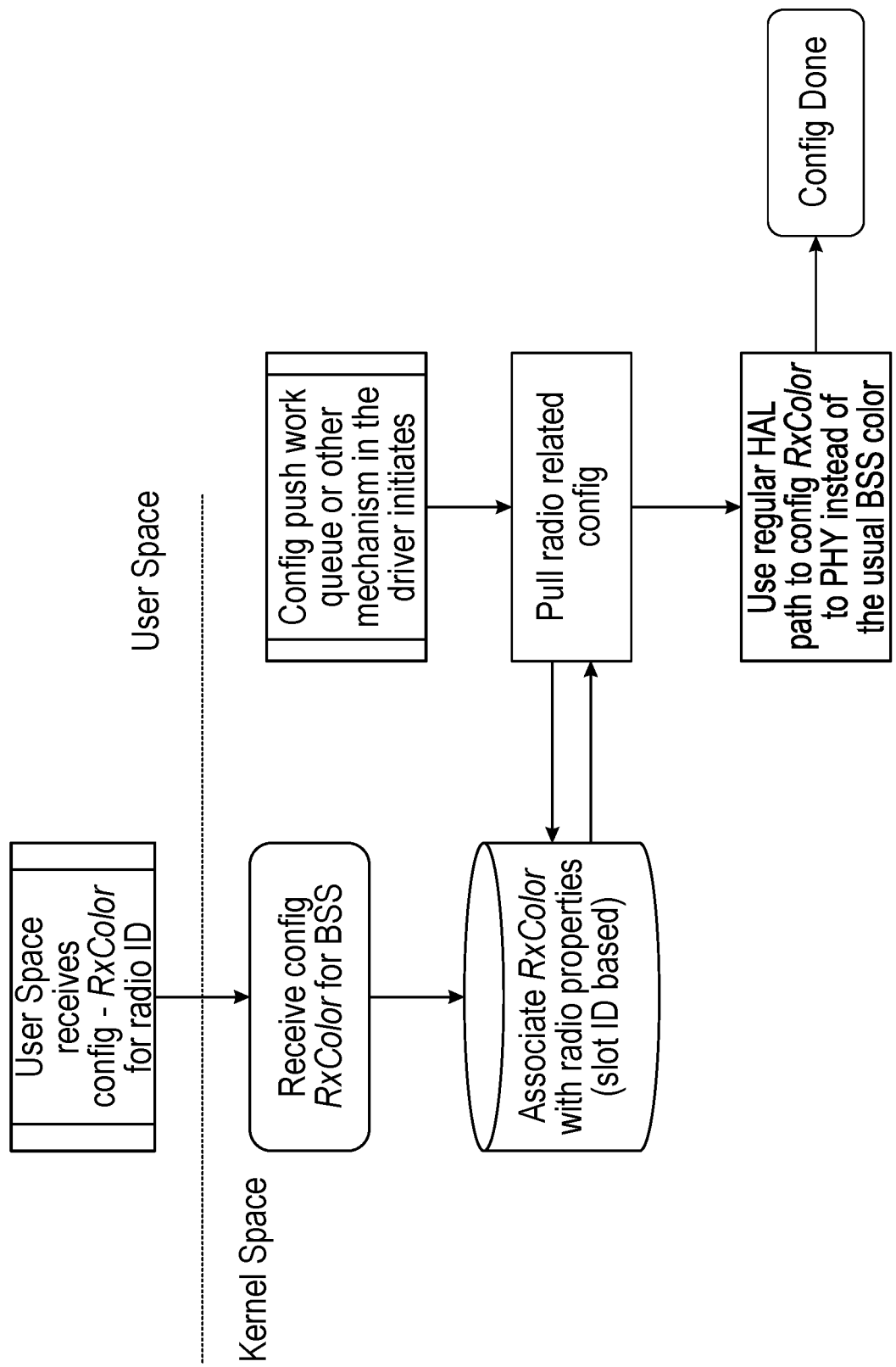
FIG. 5 is a flowchart that illustrates programming receiver based RxColor.

FIG. 5 is a flowchart that illustrates programming receiver based RxColor. As described above, the RxColor may be programmed into the hardware using the legacy mechanism of OBSS color, with some key changes. Instead of using the same color for Tx, now this RxColor may be used only for received PPDUs. As per above, the transmit path may pick the TxColor separately.

Application in a Mesh Backhaul Spatial Reuse Setting

Figure 6:
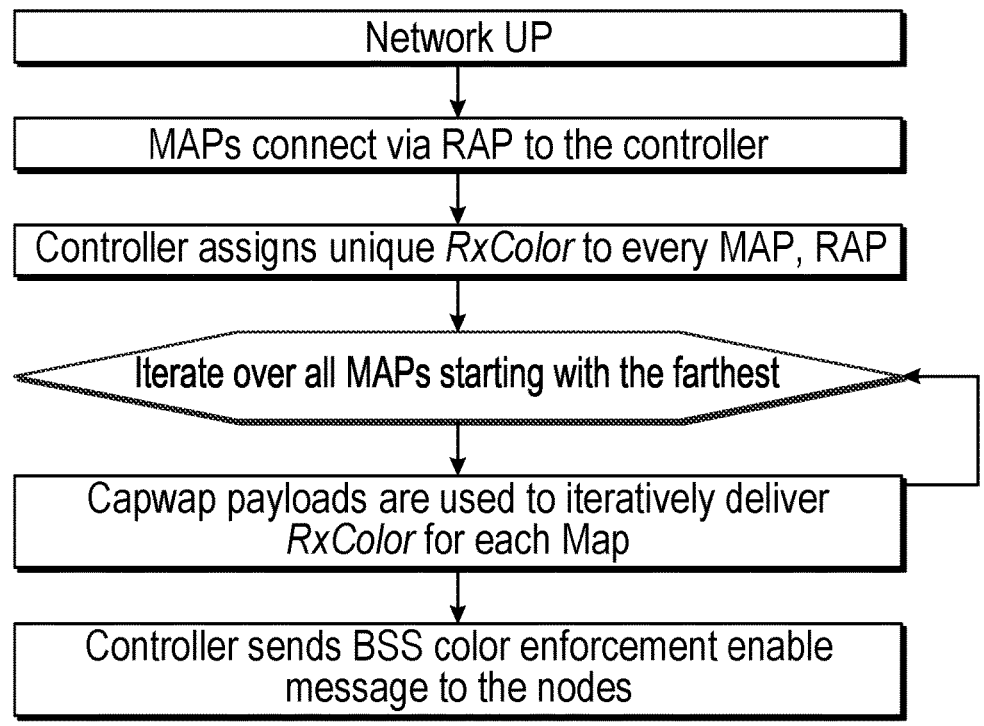
FIG. 6 is a flowchart that illustrates selecting a mesh node's OBSS RxColor.
Figure 7:
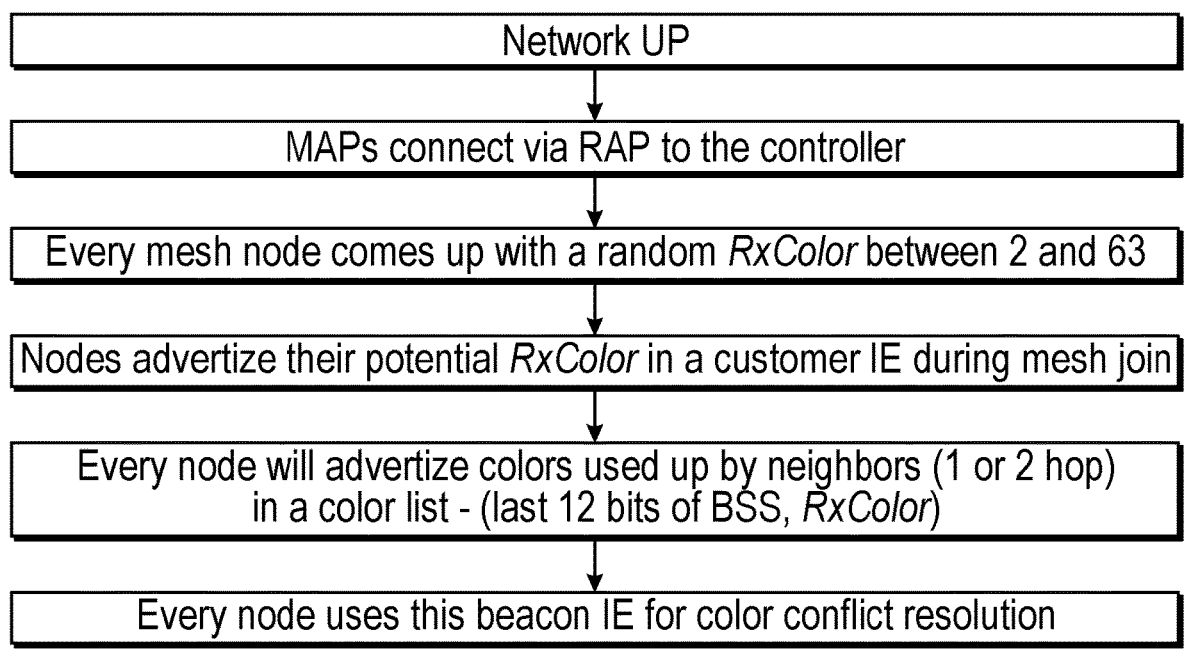
FIG. 7 is a flowchart that illustrates selecting a mesh node's OBSS RxColor.

A mesh node's OBSS RxColor may be selected. This may be accomplished, for example, by a central controller (e.g., controller 105), as illustrated by FIG. 6, or a per-mesh node (i.e., MAP) based distributed RxColor embodiment, as illustrated by FIG. 7. Regarding the central controller embodiment, the backhaul initially comes up with the legacy approach and every radio is on the same channel, RxColor. Once the initial network is in place, controller 105 may start sending a unique RxColor configuration, starting with the "farthest" mesh nodes in the network. The "farthest" mesh AP definition may be based on the number of hops from the RAP (e.g., RAP 115). Regarding the per-mesh node (i.e., MAP) based distributed RxColor embodiment, random RxColor may be generated, RxColor collision may be resolved, and RxColor propagation and operation may be performed (e.g., this may be done by sending meta-information to the controller). The OBSS TxColor may be programed to reach a particular MAP/RAP. Every mesh node (e.g., MAP) may use one of the radio driver embodiments described above. These approaches may be able to map the TxColor correctly while transmitting PPDUs to the corresponding MAP/RAP.

Figure 8:
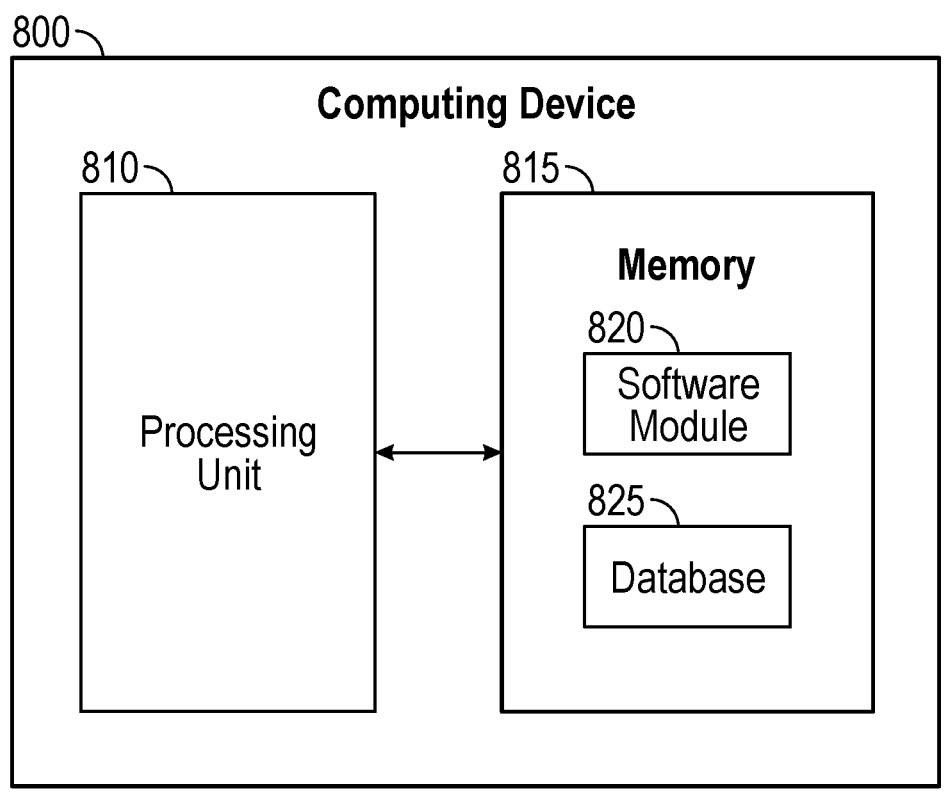
FIG. 8 is a block diagram of a computing device.

FIG. 8 shows a computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing improved mesh performance using OBSS coloring and transmission scheduling as described above with respect to FIG. 2. Computing device 800, for example, may provide an operating environment for controller 105, RAP 115, first MAP 120, second MAP 125, third MAP 130, fourth MAP 135, fifth MAP 140, and sixth MAP 145. Controller 105, RAP 115, first MAP 120, second MAP 125, third MAP 130, fourth MAP 135, fifth MAP 140, and sixth MAP 145 may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining that a plurality of Access Points (APs) in a mesh network each have a Received Signal Strength Indicator (RSSI) that is in a predetermined range;
   assigning, by a controller in response to determining that the plurality of APs each have the RSSI that is in the predetermined range, Overlapping Basic Service Set (OBSS) colors to links between the plurality of APs, wherein assigning the OBSS colors to the links between the plurality of APs comprises:
   using a first color for a downlink direction between a first AP of the plurality of AP and a second AP of the plurality of AP, and
   using a second color for an uplink direction between the first AP of the plurality of AP and the second AP of the plurality of AP;
   creating a transmission schedule for transmissions between the plurality of APs in the mesh network based on the assigned OBSS colors; and
   enabling adaptive Clear Channel Assessment (CCA) for the OBSS colors associated with the plurality of APs in the mesh network when transmitting in an opposite direction to any transmission originating from or directed to a root access point.

2. The method of claim 1, further comprising transmitting between the plurality of APs in the mesh network based on the transmission schedule.

3. The method of claim 1, further comprising determining how the mesh network is connected.

4. The method of claim 1, further comprising synchronizing the plurality of APs in the mesh network.

5. The method of claim 1, wherein the predetermined range comprises between −62 dBm and −82 dBm.

6. The method of claim 1, wherein creating the transmission schedule comprises considering a load on at least one of the plurality of APs that comprises a chokepoint in the mesh network.

7. The method of claim 1, wherein creating the transmission schedule comprises using a learning machine technique to predict buffer space on the plurality of APs.

8. The method of claim 1, wherein creating the transmission schedule comprises considering Buffer Status Reports (BSRs) of the plurality of APs sent through an upstream of the mesh network.

9. The method of claim 1, wherein assigning the OBSS colors to the links between the plurality of APs comprises changing the OBSS colors based on a transmission direction between the plurality of APs.

10. The method of claim 1, wherein assigning the OBSS colors to the links between the plurality of APs comprises assigning a same OBSS color to some APs where each have the RSSI that is not in the predetermined range.

11. A system comprising:
    a memory storage; and
    a processing unit, the processing unit coupled to the memory storage, wherein the processing unit is operative to:
    determine that a plurality of Access Points (APs) in a mesh network each have a Received Signal Strength Indicator (RSSI) that is in a predetermined range;
    assign, by a controller in response to determining that the plurality of APs each have the RSSI that is in the predetermined range, Overlapping Basic Service Set (OBSS) colors to links between the plurality of APs, wherein the processing unit being operative to assign the OBSS colors to the links between the plurality of APs comprises the processing unit being operative to:
    use a first color for a downlink direction between a first AP of the plurality of AP and a second AP of the plurality of AP, and use a second color for an uplink direction between the first AP of the plurality of AP and the second AP of the plurality of AP;

create a transmission schedule for transmissions between the plurality of APs in the mesh network based on the assigned OBSS colors; and enable adaptive Clear Channel Assessment (CCA) for the OBSS colors associated with the plurality of APs in the mesh network when transmitting in an opposite direction to any transmission originating from or directed to a root access point.

12. The system of claim 11, wherein the processing unit being operative to create the transmission schedule comprises the processing unit being operative to consider a load on at least one of the plurality of APs that comprises a chokepoint in the mesh network.

13. The system of claim 11, wherein the processing unit being operative to create the transmission schedule comprises the processing unit being operative to use a learning machine technique to predict buffer space on the plurality of APs.

14. A non-transitory computer-readable medium that stores a set of instructions which when executed perform a method executed by the set of instructions comprising:

determining that a plurality of Access Points (APs) in a mesh network each have a Received Signal Strength Indicator (RSSI) that is in a predetermined range;

assigning, by a controller in response to determining that the plurality of APs each have the RSSI that is in the predetermined range, Overlapping Basic Service Set (OBSS) colors to links between the plurality of APs, wherein assigning the OBSS colors to the links between the plurality of APs comprises:

using a first color for a downlink direction between a first AP of the plurality of AP and a second AP of the plurality of AP, and using a second color for an uplink direction between the first AP of the plurality of AP and the second AP of the plurality of AP;

creating a transmission schedule for transmissions between the plurality of APs in the mesh network based on the assigned OBSS colors; and enabling adaptive Clear Channel Assessment (CCA) for the OBSS colors associated with the plurality of APs in the mesh network when transmitting in an opposite direction to any transmission originating from or directed to a root access point.

15. The non-transitory computer-readable medium of claim 14, wherein creating the transmission schedule comprises considering a load on at least one of the plurality of APs that comprises a chokepoint in the mesh network.

16. The non-transitory computer-readable medium of claim 14, wherein creating the transmission schedule comprises using a learning machine technique to predict buffer space on the plurality of APs.

17. The non-transitory computer-readable medium of claim 14, wherein assigning the OBSS colors to the links between the plurality of APs comprises changing the OBSS colors based on a transmission direction between the plurality of APs.

18. The non-transitory computer-readable medium of claim 14, wherein assigning the OBSS colors to the links between the plurality of APs comprises assigning a same OBSS color to some APs where each have the RSSI that is not in the predetermined range.

* * * * *